United States Patent [19]
Patel

[11] Patent Number: 6,131,032
[45] Date of Patent: Oct. 10, 2000

[54] METHOD AND APPARATUS FOR MONITORING USERS OF A COMMUNICATIONS SYSTEM

[75] Inventor: Pramodkumar Patel, Phoenix, Ariz.

[73] Assignee: Motorola, Inc., Schaumburg, Ill.

[21] Appl. No.: 08/980,562

[22] Filed: Dec. 1, 1997

[51] Int. Cl.[7] ...................................................... H04B 1/06
[52] U.S. Cl. ........................... 455/445; 455/26.1; 379/33
[58] Field of Search .................................. 455/422, 423, 455/424, 450, 455, 515, 517, 521, 26.1; 379/33, 59, 35, 7, 34

[56] References Cited

U.S. PATENT DOCUMENTS

| | | | |
|---|---|---|---|
| 5,428,667 | 6/1995 | Easterling et al. | 379/59 |
| 5,590,171 | 12/1996 | Howe et al. | 379/33 |
| 5,710,971 | 1/1998 | Armbruster et al. | 455/12.1 |
| 5,826,171 | 10/1998 | Franke | 455/26.1 |
| 5,881,132 | 3/1999 | O'Brien et al. | 379/35 |
| 5,892,811 | 4/1999 | Armbruster et al. | 379/7 |

*Primary Examiner*—Daniel S. Hunter
*Assistant Examiner*—Pablo N. Tran
*Attorney, Agent, or Firm*—Dana B. LeMoine; Frank J. Bogacz

[57] ABSTRACT

A method and apparatus for centralizing the administration of intercept lists includes a master intercept list (305) and an interface (510) which communicates with switches (410). Switches (410) may or may not include local intercept lists (415). When a user makes a call, a switch (410) queries the local intercept list (415) or the master intercept list (305). Information from the query is used to determine whether to intercept the call.

27 Claims, 5 Drawing Sheets

METHOD AND APPARATUS FOR MONITORING USERS OF A COMMUNICATIONS SYSTEM

FIELD OF THE INVENTION

This invention relates in general to the monitoring of users in communications systems and, in particular, to the centralized administration and control of the monitoring function within the communications systems.

BACKGROUND OF THE INVENTION

Many communications systems have the ability to provide intercept services. Intercept services are services for intercepting calls and providing an eavesdropping capability. These services are lawfully used mainly by law enforcement agencies (LEA) within their jurisdictions.

In prior art communications systems, intercept lists are maintained within switches, so that calls to be intercepted can be routed by the switches to the appropriate intercepting party, usually a LEA. When a call is placed, the switch consults the intercept list and, if the list designates the call as one to be intercepted, the switch routes the call to the intercepting party for eavesdropping. This works well as long as the juridical boundaries of LEAs and the service areas of communications systems coincide. This does not work as well when the juridical boundaries of LEAs do not coincide with the service area of communications systems. For example, if two communications systems are within the juridical boundaries of an LEA, and a user to be intercepted leaves the service area of the first system and enters the service area of the second system, it is necessary for the intercepting LEA to have that user added to the intercept list of the second system. As users become more mobile, and as the demand for intercept services grows, the problem becomes more acute.

In order for LEAs to track users to be intercepted through multiple communications systems, LEAs must contact service providers of those systems to have the users' information entered in the appropriate intercept list. It would be desirable to have a method and apparatus for dynamically updating intercept lists contained in switches so that LEAs would not have the burden of manually attending to the problem.

Satellite communications systems are revolutionizing the communications industry, and are exacerbating the already acute problems of maintaining intercept lists. People are now able to communicate with anyone, anytime, anywhere on the planet. This causes problems for the LEAs to control the lawful interception of calls. The service areas of the communications system are no longer fixed, and so it is not possible to determine a priori whether a user is within the juridical boundaries of the LEA based on which communications system is being accessed. The prior art methods and systems rely on the fact that if a user is using a given communications system, he is within the juridical boundaries of the LEA, and the call is automatically intercepted. With satellite based systems, the fact that a user is using the system does not show that he is within the juridical boundaries of the LEA. In fact, the user could be within one of many different LEA jurisdictions, and potentially, anywhere on the earth. It would be advantageous to have a method and apparatus for location based intercept. That is, it would be advantageous to have a system that would make intercept decisions based on user location information.

What is needed is a method and apparatus for centralized management and administration of intercept lists in a communications system. What is also needed is a method and apparatus for location based intercept in a communications system.

DETAILED DESCRIPTION OF THE DRAWINGS

Figure 1:
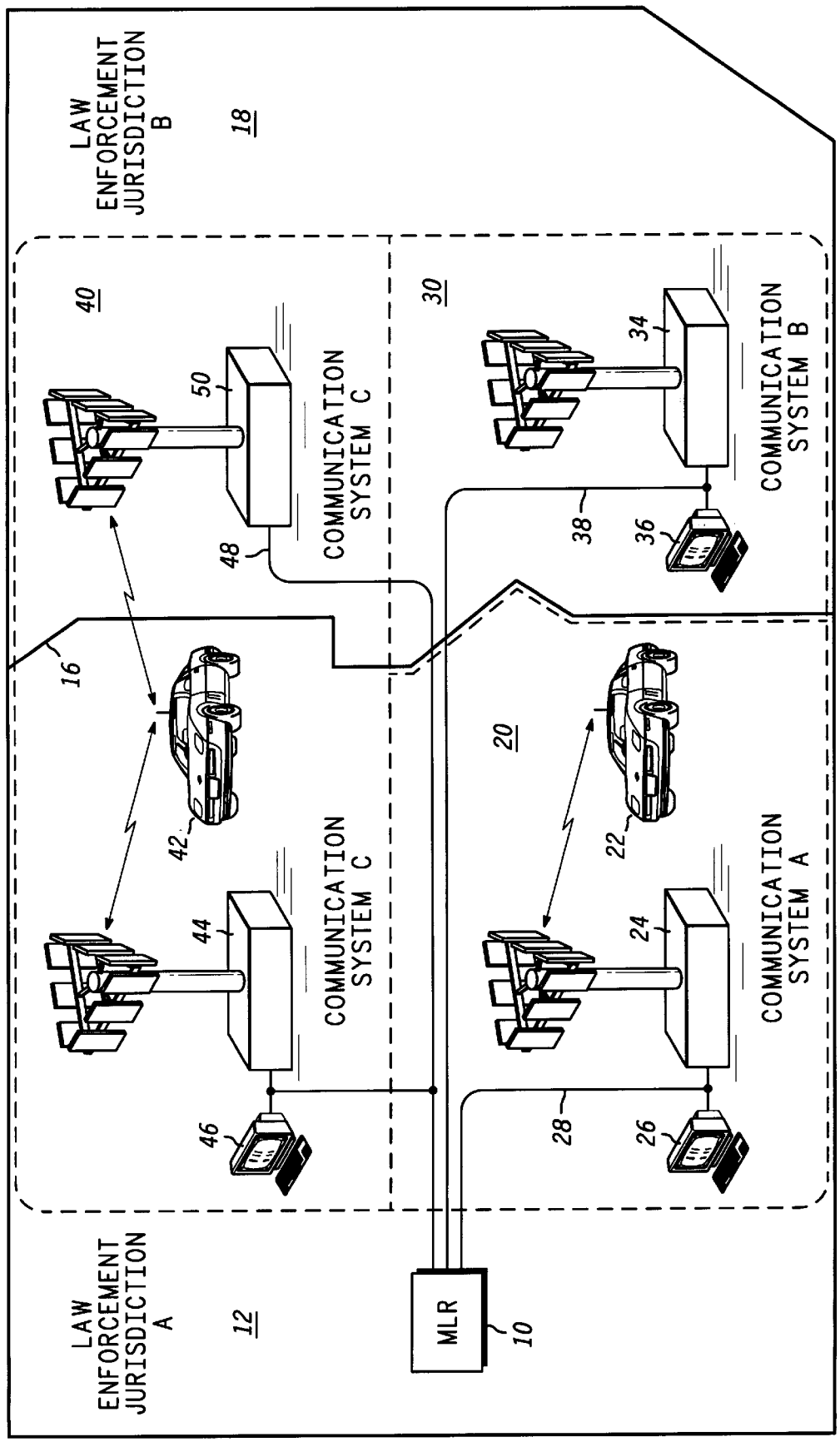
FIG. 1 shows a diagram of multiple LEA jurisdictions and multiple mobile communications systems in accordance with a preferred embodiment of the present invention.

Turning now to the drawings in which like reference characters indicate corresponding elements throughout the several views, attention is first directed to FIG. 1.

FIG. 1 shows a diagram of multiple LEA jurisdictions and multiple mobile communications systems in accordance with a preferred embodiment of the present invention.

Jurisdiction 12 and jurisdiction 18 are law enforcement agency jurisdictions with common geographical boundary 16. Jurisdiction 12 and jurisdiction 18 can be two adjacent local jurisdictions, such as counties or cities, or can be two adjacent countries, such as exist in Europe and Asia. Within jurisdiction 12 is communications system 20 and a portion of communications system 40. Within jurisdiction 18 is communications system 30 and a portion of communications systems 40. Shown within communications system 20 is subscriber 22, switch 24, terminal 26, and link 28. Shown within communications system 30 is switch 34, terminal 36, and link 38. Shown within communications system 40 is subscriber 42, switch 44, terminal 46, link 48, and switch 50. Communications systems 20, 30, and 40 can be either wireless or wireline systems.

Within communications system 20, terminal 26 functions as a user interface for the service provider to control switch 24. Terminal 26 can be a computer and is usually an integral part of switch 24. Terminal 26 is shown separate from switch 24 in FIG. 1 for ease of explanation. When subscriber 22 wishes to make a call, he accesses communications system 20 by contacting switch 24. Switch 24 then routes the call through communications system 20. If subscriber 22 is supposed to be monitored by LEA A in jurisdiction 12, then it is the responsibility of switch 24 to recognize this, intercept the call, and route it to the LEA.

In order for switch 24 to perform this function, it needs information regarding subscribers to monitored, and how to route the monitored call. In a first embodiment of the invention, terminal 26 maintains a list of all subscribers to be monitored. When switch 24 receives a call request from a subscriber, terminal 26 searches the intercept list and determines whether the subscriber making the call is one to be monitored. Since communications system 20 is within jurisdiction 12, LEA A has control of the contents of the intercept list included within terminal 26.

If subscriber 22 travels from communications system 20 into communications system 30, subscriber 22 no longer accesses communications system 20. Now when subscriber 22 wishes to place a call, he accesses communications system 30 by contacting switch 34. If subscriber 22 is to be monitored in this region, it is the responsibility of switch 34 to recognize this, intercept the call, and route it to the LEA. If LEA A wishes to monitor subscriber 22 when subscriber 22 is using communications system 30, LEA A has to get the subscriber's intercept information into the intercept list included within terminal 36. This usually entails getting permission from LEA B to monitor a specific subscriber within jurisdiction 18, and then getting the intercept list within terminal 36 modified. This way, when subscriber 22 places a call through switch 34, terminal 36 can search its own intercept list and find the information that instructs the switch to monitor the call by routing the call to LEA A.

Instead of roaming from communications system 20 to communications system 30, subscriber 22 could roam from communications system 20 to communications system 40. Now in order for subscriber 22 to be monitored, LEA A has to get the subscriber's intercept information into the intercept list included within terminal 46. Even though subscriber 22 is still within jurisdiction 12, LEA A still has to get the subscriber's intercept information into terminal 46 because subscriber 22 has roamed from one communications system to another.

For exemplary purposes, FIG. 1 shows only three jurisdictions with a common boundary. In most real situations, any one LEA jurisdiction will have many other jurisdictions with common boundaries. If an LEA wants to monitor a roaming subscriber in all adjacent jurisdictions, then the LEA typically gets permission from all appropriate LEAs and then endeavors to have the subscriber's intercept information added to all necessary communications systems.

As previously described, communications system 20 and communications system 30 have a common boundary at boundary 16 between jurisdiction 12 and jurisdiction 18. This is a simplistic example because juridical boundaries and communications system boundaries do not always coincide. Communications system 40 is an example of a communications system whose boundaries do not coincide with that of an LEA jurisdiction.

Communications system 40 is partially included within jurisdiction 12 and partially included within jurisdiction 18. In the first embodiment currently being discussed, terminal 46 includes an intercept list. If subscriber 42 is included within the intercept list, then when subscriber 42 places a call, switch 44 retrieves intercept information from terminal 46, and routes the call to LEA A for monitoring. If subscriber 42 stays within communications system 40, but travels from jurisdiction 12 to jurisdiction 18, then when subscriber 42 makes a call, switch 50 has the responsibility to route the call to LEA A. Switch 50 will consult terminal 46, and receive instructions to route the call to LEA A. This works well when LEA A and LEA B have an all encompassing reciprocal agreement regarding the monitoring subscribers in each other's jurisdictions, but otherwise is a problem.

Monitoring Location Register

The monitoring location register (MLR) comprises a method and apparatus for centralizing the management and administration of intercept lists. MLR 10 in FIG. 1 includes a master intercept list. As previously stated with reference to a first embodiment, when any of the three communications systems shown receive a call request, they query an intercept list to ascertain whether or not the call is to be intercepted. MLR 10 simplifies the task of administering the multiple local intercept lists through the use of a master intercept list. Switches can query MLR 10 for every call request, or MLR 10 can maintain the copy of the list resident on the switch.

In the first embodiment where local intercept lists are maintained at the switches (or terminals) within the communications systems, MLR 10 simplifies the task of administration because law enforcement agencies only need to update the master intercept list in MLR 10. MLR 10 then automatically updates the multiple local intercept lists included in the different communications systems.

In a second embodiment, local lists are not maintained in the switches. Instead, each switch queries MLR 10 for every call request. MLR 10 searches the master intercept list and returns intercept information for the specific call. This second embodiment is advantageous because the MLR eliminates the need for each system to maintain the data required, and perform the logic necessary to determine whether and what form of intercept should occur.

Of course, a mixture of the first embodiment and the second embodiment can exist. For example, communications system 20 can maintain local intercept lists while the other communications systems don't, and all three communications systems will still benefit from the services provided by MLR 10. In addition, MLR 10 is not dependent on the protocol used between the subscribers to be intercepted and the systems with which they are communicating. That is to say, subscriber 22 could be using a Global System for Mobile Communications (GSM) system, an Interim Standard-41 (IS-41) system, an Integrated Services Digital Network (ISDN) line, a paging system, or any other; MLR 10 applies in all cases.

In a preferred embodiment, a representative query to MLR 10 includes information regarding the location of the subscriber. Since MLR 10 potentially services a large geographic area spanning many LEA jurisdictions, MLR 10 benefits from the knowledge of the of the user's location when ascertaining whether the call should be intercepted.

MLR 10 provides multiple advantages. Administration of systems using MLR 10 is simpler than administration of prior art systems because there is a single point of contact for worldwide surveillance. Agreements between jurisdictions are handled easier in that once agreements are made, they can be carried out within MLR 10 rather than agreeing jurisdictions having to enter redundant information in many different, disparate, communications systems.

Communications systems query MLR 10 when intercept related information is desired. In an exemplary communications system, intercept related information is desirable at multiple points in time, including but not limited to: when a call setup is attempted, when a call is established, when no successful call is established, or on change of location.

Queries to MLR 10 are preferably performed by sending information to the MLR. The information sent to the MLR preferably comprises one or more of: subscriber identity, type of call, called party, calling party, location, or time of call. The MLR uses this information to decide whether or not to intercept the call. Possible responses from MLR 10 to the querying system include:

1) Do nothing (no intercept);

2) Intercept and provide a record of the relevant call data (location, called and calling party, time of call); and 3) In addition to (2), intercept the call contents and deliver them to the directory number(s) specified (the directory numbers being those of the intercepting monitoring agencies).

Figure 2:
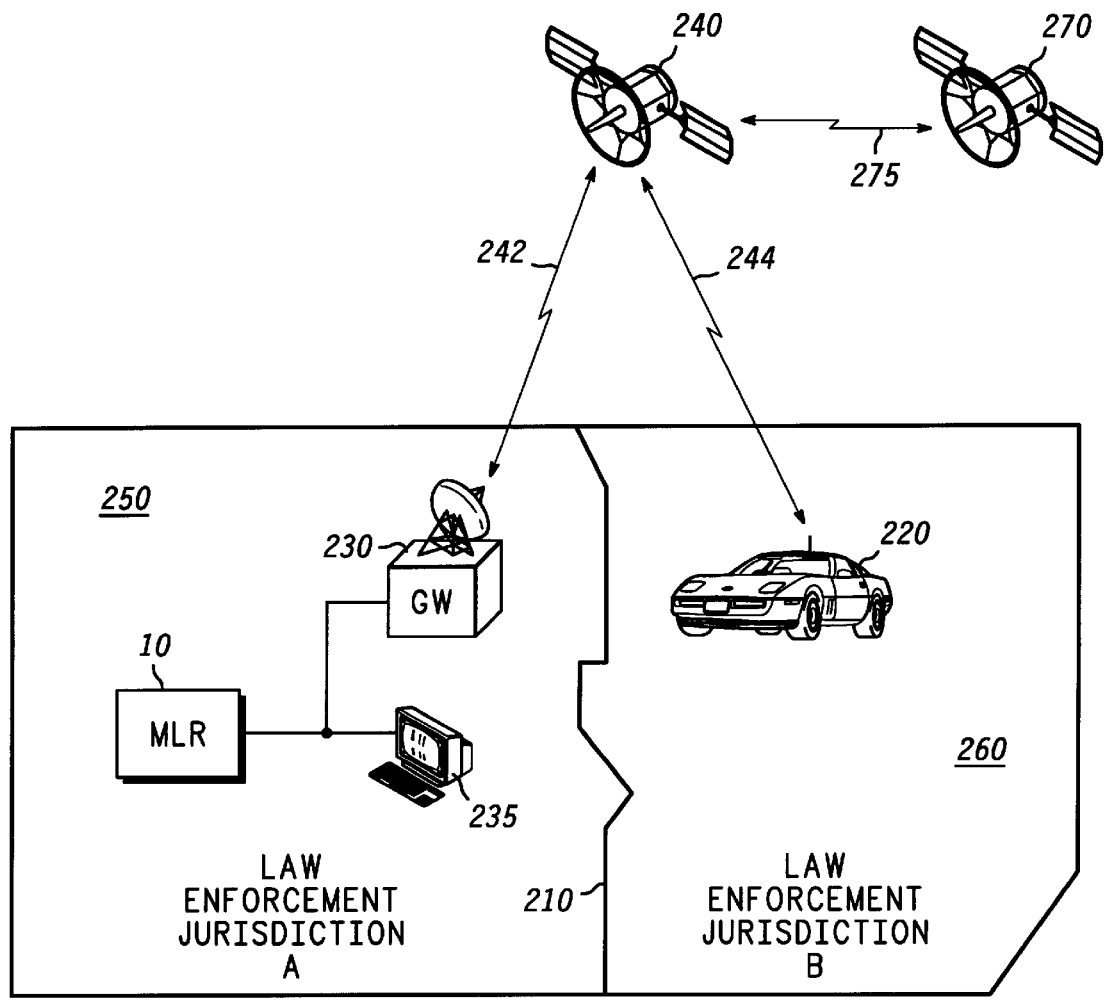
FIG. 2 shows a diagram of multiple LEA jurisdictions and a satellite communications system in accordance with a preferred embodiment of the present invention.

FIG. 2 shows a diagram of multiple LEA jurisdictions and a satellite communications system in accordance with a preferred embodiment of the present invention.

FIG. 2 shows two LEA jurisdictions A and B, demarcated by boundary 210. The area to the left of boundary 210 is jurisdiction A 250, and the area to the right of boundary 210 is jurisdiction B 260. FIG. 2 also shows user 220, satellites 240 and 270, gateway (GW) 230, terminal 235, and MLR 10.

Satellite 240 can be the only satellite in a communications system, but is preferably one of many satellites in a constellation. When satellite 240 is a single satellite, it is preferably in a geosynchronous orbit so that the same geographic area is serviced by the satellite at all times. In a preferred embodiment of the present invention, however, satellite 240 is one of many satellites in low earth orbit (LEO). Satellite 270 is another satellite in the LEO constellation, and is shown communicating with satellite 240 via inter-satellite link 275. When in a LEO orbit, satellites 240 and 270 move relative to the earth, and so the footprint of the satellites on the earth are constantly changing.

The satellite communications system shown in FIG. 2 can be comprised of satellites that operate as "bent pipes" where all communications received from ground transmitters are transmitted directly back to the ground, or can be comprised of satellites that operate as "switches in the sky" where calls are routed on inter-satellite links before being retransmitted to the ground.

User 220 communicates with the communications system by communicating with satellite 240 via link 244. Satellite 240 routes the communications to gateway 230 on the ground. If user 220 is to be monitored, it is the responsibility of gateway 230 to recognize this, intercept the call, and route it to the appropriate LEA. The use of a satellite system to route the communications exacerbates the problems identified in connection with the terrestrial communications systems of FIG. 1. In satellite systems, the coincidence of LEA jurisdictions and communications systems boundaries is rarely clear.

Location Based Intercept

The combined movement of the communications system and the user relative to LEA juridical boundaries has created a need for location based intercept. Location based intercept is the decision to intercept a particular user's communications, on behalf of a particular LEA, based on the user's location. Location based intercept does not rely on the fact that the user is within the boundaries of a particular communications system, it instead relies on the actual physical location of the user.

As shown in FIG. 2, gateway 230 is connected to terminal 235. In a first embodiment, terminal 235 includes an intercept list that includes intercept information based in part on user identities and user locations. When gateway 230 receives a call, terminal 235 is queried by gateway 230 and terminal 235 returns intercept information. The embodiment of FIG. 2 differs from that of FIG. 1 in that terminal 235 benefits from information describing the location of user 220. This is because in a satellite system, user 220 can be within one of many different LEAs. Intercept may be authorized in some cases and not in others, yet the same intercept list can be consulted in every case. This way, terminal 235 can search the intercept list and determine if the user is within the juridical boundary of an LEA that has requested intercept services.

In a second embodiment, MLR 10 includes a master intercept list, and MLR 10 can be queried directly by gateway 230. Gateway 230 queries MLR 10 instead of querying terminal 235. This way, the MLR can search the intercept list and determine if the user is within the juridical boundary of an LEA that has requested intercept services.

Of course, a mixture of the first embodiment and the second embodiment can exist. For example, intercept lists can be maintained in terminals, in gateways, in the MLR, or in any combination, and all components of the communications system will still benefit from the services provided by MLR 10. In addition, MLR 10 is not dependent on the protocol used between the subscribers to be intercepted and the systems with which they are communicating.

Figure 3:
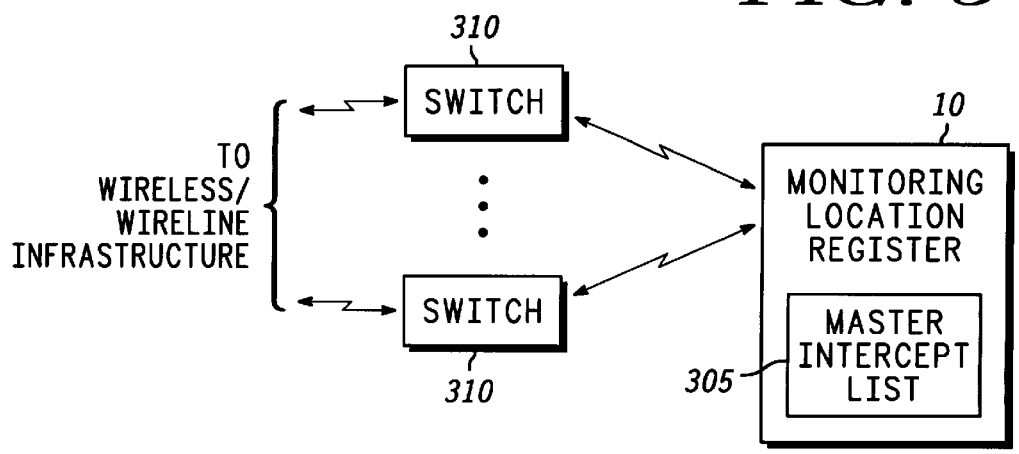
FIG. 3 shows a diagram of a monitoring location register and switches in accordance with a preferred embodiment of the present invention.

FIG. 3 shows a diagram of a monitoring location register and switches in accordance with a preferred embodiment of the present invention.

Included in FIG. 3 are MLR 10 and multiple switches 310. Switches 310 can be conventional switches in a wireline communications system, or can be switches in a wireless communications system. Switches 310 can also be switches in a satellite communications system. Included within MLR 10 is master intercept list 305. In the embodiment of FIG. 3, switches 310 do not include intercept lists. When a switch 310 receives a call from the communications system, that switch 310 queries MLR 10. MLR 10 receives the query from the switch and then searches the master intercept list. The result of the master intercept list search yields intercept information specific to the call currently being handled by the switch.

In a preferred embodiment, switches 310 query MLR 10 with information relating to the current call. Typical information relating to the current call includes calling party information and called party information. Calling party information can include a variety of information about the caller, such as calling party identification information and calling party location information. Likewise, called party information can include called party identification information and called party location information.

MLR 10 receives the query made by the switch, and searches master intercept list 305. MLR 10 returns intercept information to the switch that made the query. The intercept information preferably includes instructions to the switch that allow the switch to appropriately route the call for intercept.

The embodiment of FIG. 3 is applicable to satellite systems, ground mobile systems, or wireline systems. MLR 10 does not have to have knowledge of what kind of system is making the query; the advantages of MLR 10 are provided regardless of the type system making the query.

The embodiment of FIG. 3 has many advantages. The intercept list function has been moved from multiple switches to a central monitoring location register. The central MLR allows a single point from which administration of the intercept lists can be maintained. An LEA can request service once, and include all jurisdictions where the LEA has agreements. The LEA does not have to manually contact multiple providers to intercept a user traveling from jurisdiction to jurisdiction and from system to system within a jurisdiction. Of course, there is no requirement that only one MLR exist within a group of systems, but as the MLR function is centralized further, the advantages become more pronounced. Indeed, there may be more than one MLR and the MLRs may be networked together (across national boundaries for example) to track subscribers across the jurisdictional boundaries of each MLR. The MLRs may update each other's lists by monitoring subscriber location update activity across jurisdictional boundaries.

Figure 4:
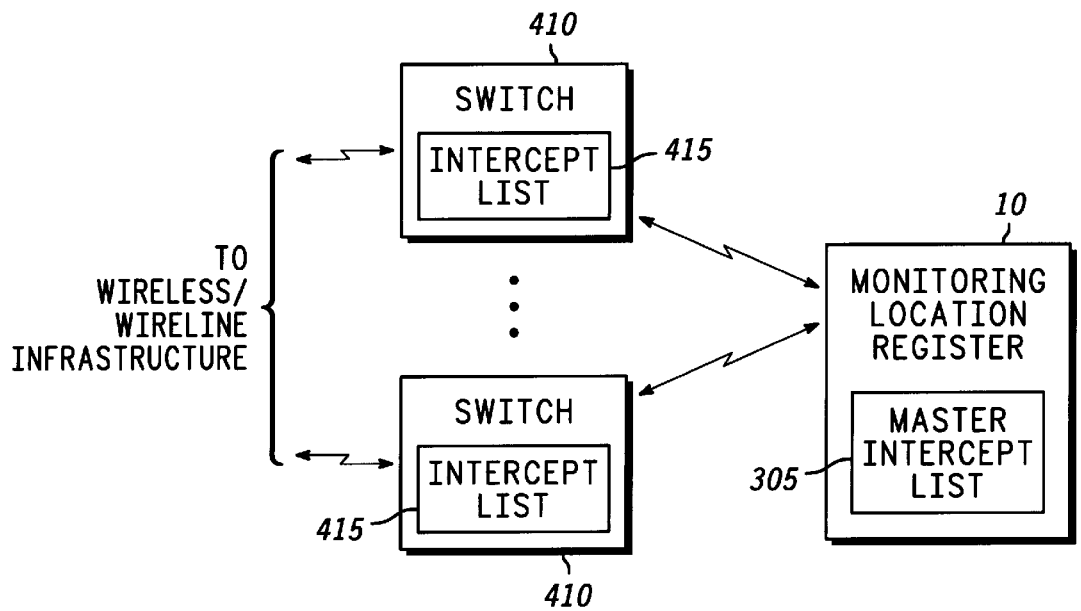
FIG. 4 shows a diagram a monitoring location register and switches in accordance with a preferred embodiment of the present invention.

FIG. 4 shows a diagram of a monitoring location register and switches in accordance with a preferred embodiment of the present invention.

The diagram of FIG. 4 includes MLR 10 and switches 410. MLR 10 includes master intercept list 305, and switches 410 include intercept lists 415. The hybrid embodiment of FIG. 4 is advantageous because many existing systems operate with local intercept lists maintained within switches. When calls are made, the switches query the local intercept lists to ascertain the necessity of intercepting the call. In this context, MLR 10 maintains the master intercept list, which in turn is used to maintain a number of local intercept lists. Updates of local lists can be a record at a time or can be an entire list update at once.

The advantages of MLR 10 are realized by MLR 10 providing a single point of administration for a number of intercept lists, possibly from different, disparate, communications systems. MLR 10 works with existing systems, yet will alleviate the burden of manually updating the local lists.

Figure 5:
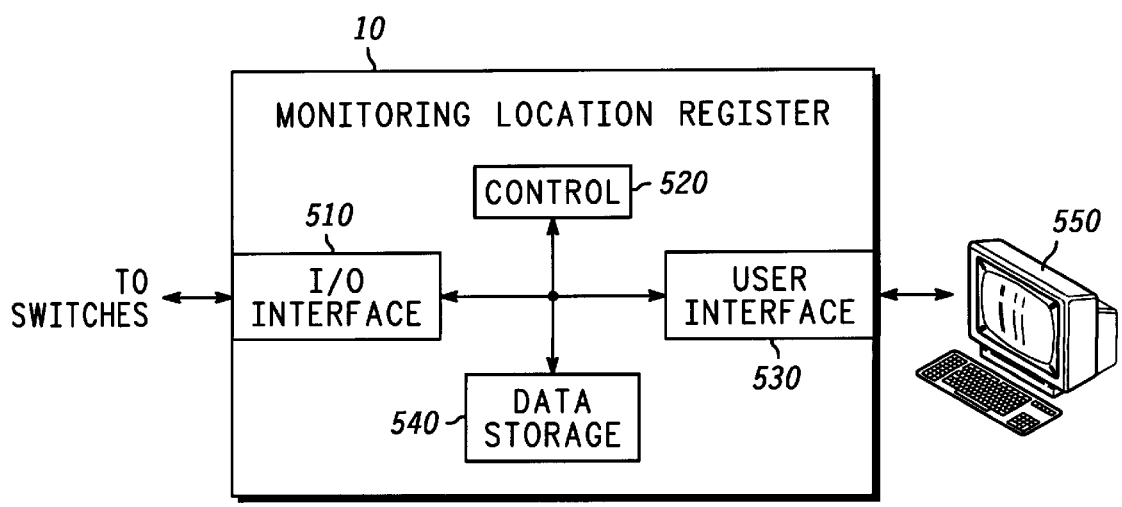
FIG. 5 shows a diagram of a monitoring location register in accordance with a preferred embodiment of the present invention.

FIG. 5 shows a diagram of a monitoring location register in accordance with a preferred embodiment of the present invention.

MLR 10 includes input/output (I/O) interface 510, control 520, user interface 530, and data storage 540. Also shown in FIG. 5 is terminal 550 connected to user interface 530 of MLR 10.

I/O interface 510 communicates with switches. When switches make queries to MLR 10, or when MLR 10 provides monitoring information to switches, the information passes through I/O interface 510.

Data storage 540 supports the storing of master intercept list. Data storage 540 can be non-volatile storage such as a hard disk, or can be volatile storage such as high speed random access memory (RAM), but is preferably a combination of the two. The use of high speed RAM is advantageous because if the master intercept list is maintained in RAM, queries made by switches can be responded to very quickly.

User interface 530 is an interface that provides the ability to administer MLR 10. This interface provides a single point of control for the maintenance of a master intercept list.

Control 520 provides control functions necessary for the operation of MLR 10. Functions of control 520 include controlling user interface 530 and I/O interface 510, and controlling the use of data storage 540. Control 520 is preferably a microprocessor or other computing device capable of controlling the interfaces and searching the master intercept list included in data storage 540.

Terminal 550 is shown as a device that allows a user to interact with MLR 10. Terminal 550 is preferably separate from MLR 10 as shown for reasons of modularity, but in an alternate embodiment, terminal 550 is integrated as a part of MLR 10.

Figure 6:
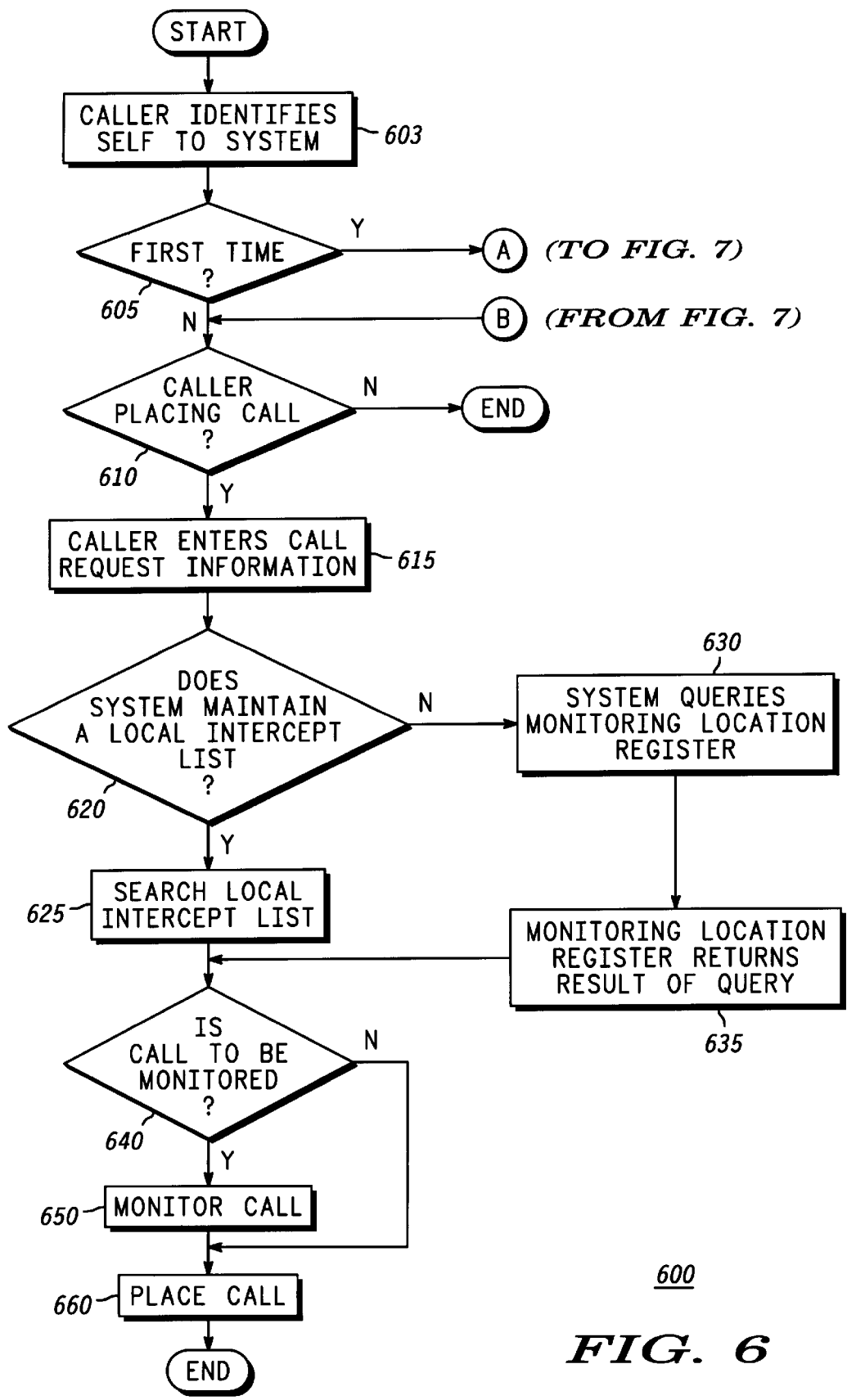
FIG. 6 shows a flow chart for a method of monitoring a user in a communications system in accordance with a preferred embodiment of the present invention.

FIG. 6 shows a flow chart for a method of monitoring a user in a communications system in accordance with a preferred embodiment of the present invention.

Method 600 begins with step 603 when a caller identifies himself to a system. In wireless systems, callers (or users) identify themselves to the system periodically even if they are not making a call. This allows systems to keep track of users as they roam from system to system. In a wireline system, a caller usually identifies himself to a system just prior to making a call.

In the case of wireless systems, information provided to the system by the user usually includes subscriber identification information in the form of a Mobile Identification Number (MIN), International Mobile Subscriber Identity (IMSI), Mobile Subscriber ISDN (MSISDN), or a serial number associated with the equipment being used. In addition, location identification information may also be provided.

After the caller identifies himself to the system in step 603, the system determines if this is the first time the caller has identified himself in step 605. If this is not the first time, processing proceeds to step 610. On the other hand, if this is the first time the caller has identified himself to the system, processing proceeds to step 710 of FIG. 7.

Figure 7:
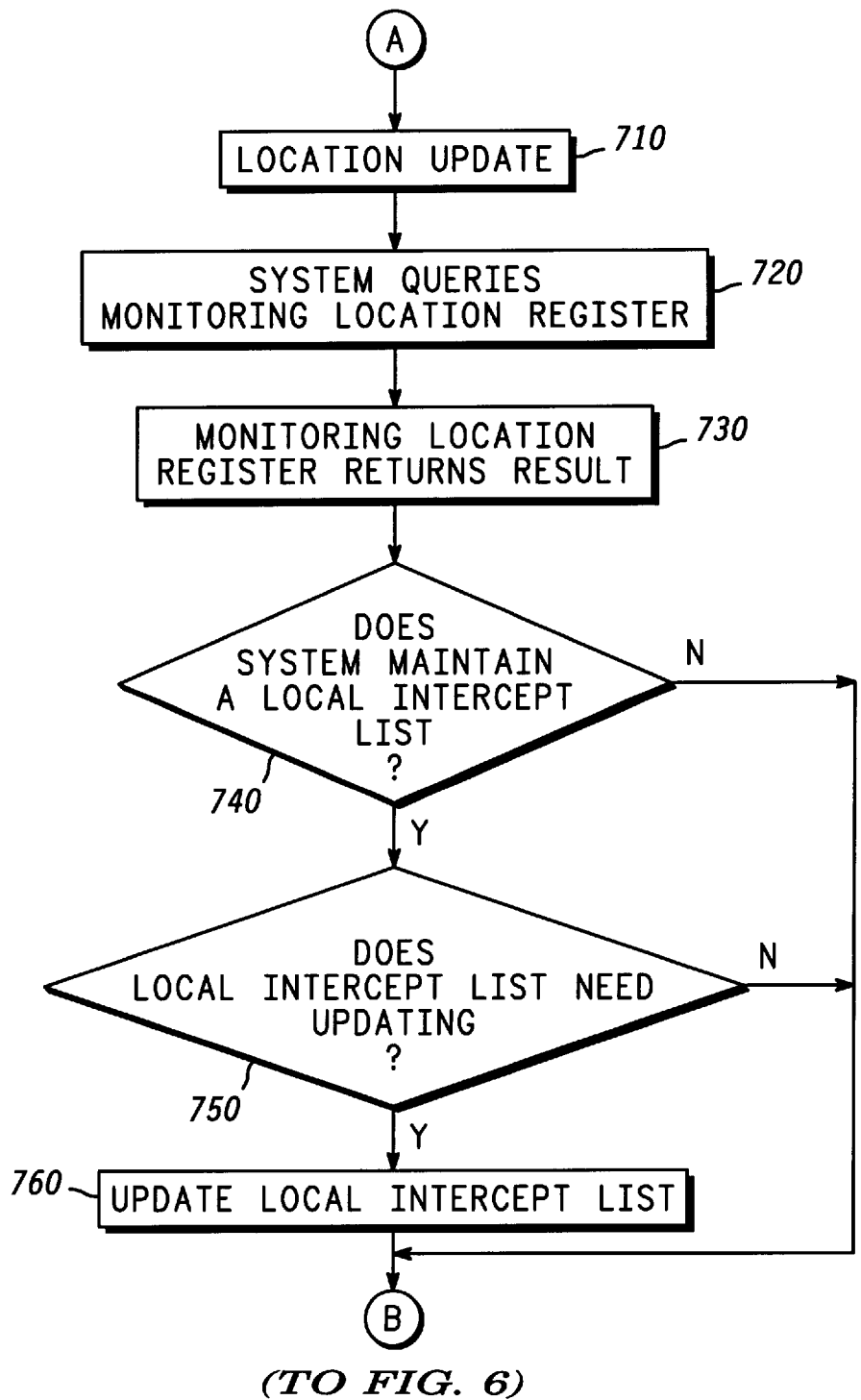
FIG. 7 shows a flow chart for a method of maintaining an intercept list in accordance with a preferred embodiment of the present invention.

FIG. 7 shows a flow chart for a method of maintaining an intercept list in accordance with a preferred embodiment of the present invention.

Step 710 of FIG. 7 is entered when the caller has identified himself to the system for the first time. In step 710 the system performs a location update. "Location update" is a GSM term that refers to the procedure by which a subscriber registers in a new system and at the same time updates its home location register (home system subscriber database) as well as the previous system in which was registered.

In step 720 the subscriber information sent to the system in step 603 (FIG. 6) is used to query the MLR. If the MLR determines that the location of the subscriber is being tracked by an agency, then in step 730 it returns information requesting the generation of an intercept record. An intercept record is a record of the event, where the record includes fields for subscriber identity, location, and event. In this case, the event is simply the caller identifying himself to the system.

In an alternate embodiment, the location update as shown in step 710 is not an event distinguishable from the MLR query of step 720. In this embodiment, the MLR makes the determination that a location update is necessary, and performs it without further intervention by the querying system.

In addition to instructions for generating an intercept record, if the caller is to be intercepted, the MLR returns an entry from the master intercept list. If in step 740 the system determines that it maintains a local intercept list, and in step 750 the system determines that the local intercept list needs to be updated, then the system updates the local intercept list with the list entry received from the MLR in step 760. Otherwise, processing proceeds to step 610 (FIG. 6).

Referring now back to FIG. 6, processing continues with decision block 610 where the system determines whether the caller is placing a call. If not, then processing ends. If the caller is making a call, then processing continues with step 615 when the caller enters call request information. The caller directly enters the number of the party he is trying to reach. This results in a message from the subscriber to the system that includes subscriber identity, type of call, and called party.

In step 620 the system determines whether a local intercept list is maintained on the system. If so, then it is searched in step 625 to see if the call should be intercepted. If a local intercept list is not maintained on the system, then a query is made to the MLR to see if the call should be intercepted. The MLR is queried in step 630, and returns an entry from the master intercept list.

In an alternate embodiment, the MLR determines whether to intercept the call based not just on the caller's information, but also on the called party's information. The system queries the MLR with calling party information such as subscriber ID, location, and type of call. The system also queries the MLR with called party information, such as called party identification. If the MLR has a record that shows the called party should be monitored, an intercept record will be made based on the called party information. Other fields are contemplated for querying the MLR such as the time of the call.

In summary, the method and apparatus of the present invention provides an advantageous means for centralizing the administration of intercept lists in communications systems. The monitoring location register provides a consistent user interface to multiple law enforcement agencies while maintaining intercept list information for a number of communications systems.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of operating a switch in a cellular communications system, said method comprising the steps of:
   receiving by the switch a call request from a calling party;
   sending by the switch calling party information to a register, said register including information relating to monitoring criteria based upon physical location of a party to a call;
   receiving by the switch intercept information from said register, said intercept information includes information regarding whether the call should be intercepted; and
   routing said call request.

2. The method of claim 1 further comprising the step of:
   responsive to said intercept information, routing said call request to an intercepting party.

3. The method of claim 1 wherein said intercept information includes call intercept routing instructions.

4. The method of claim 1 wherein said calling party information includes calling party location information.

5. The method of claim 1 further comprising the step of:
   prior to said step of receiving intercept information, sending called party information to said register.

6. The method of claim 5 wherein said called party information includes called party location information.

7. A method of operating a switch in a cellular communications system, said method comprising the steps of:
   receiving a call request for a call from a calling party;
   sending called party information to a register, said register determining from an intercept list located within said register, based on said call party location information, whether said call request requires monitoring;
   receiving intercept information from said register, said intercept information includes a field that specifies whether the call should be intercepted; and
   routing said call request.

8. The method of claim 7 further comprising the step of:
   responsive to said intercept information, routing said call request to an intercepting party.

9. The method of claim 7 wherein said intercept information includes call intercept routing instructions.

10. The method of claim 7 wherein said called party information includes called party location information.

11. The method of claim 10 further comprising the step of prior to said step of receiving intercept information, sending calling party information to said register.

12. The method of claim 11 wherein said calling party information includes calling party location information.

13. The method of claim 7 wherein said party to a call information includes calling party location information.

14. A method of operating a monitoring location register, said method comprising the steps of:
   receiving call request information associated with a call, said call request information includes a calling party location or a called party location; and
   responsive to said call request information, sending call intercept information.

15. The method of claim 14 wherein said call intercept information includes a field specifying whether the call should be intercepted.

16. The method of claim 14 further comprising the step of prior to said step of sending, searching a database of parties to retrieve said call intercept information.

17. A method of maintaining intercept lists comprising the steps of:
   receiving intercept information into a master intercept list, said master intercept list being maintained within a monitoring location register; and
   disbursing said intercept information to a plurality of switches wherein each of said plurality of switches includes a local intercept list.

18. A method of updating an intercept list comprising the steps of:
   a switch receiving a user identification from a user;
   said switch querying a monitoring location register with said user identification;
   said monitoring location register sending an intercept list entry to said switch; and
   said switch updating an intercept list included in said switch with said intercept list entry.

19. The method of claim 18 further comprising the step of:
   prior to said querying step, said switch receiving call request information from said user;
   and wherein said querying step further comprises the step of querying said monitoring location register with said call request information.

20. The method of claim 18 where said user identification includes information relating to said user's current location.

21. A monitor location register comprising:
   a data storage device for storing user intercept information, said storage device including an intercept list, said intercept list including a plurality of intercept records, said intercept records including a location data field denoting physical locations in which a user named in user identification data may be monitored by a monitoring authority;
   an input interface for receiving call request information; and
   an output interface for sending said user intercept information.

22. The monitoring location register of claim 21 wherein said intercept records include calling party location information.

23. The monitoring location register of claim 21 wherein said intercept records include called party location information.

24. The monitoring location register of claim 21 wherein said intercept records include a monitoring party identity.

25. The monitoring location register of claim 21 wherein said intercept records include intercept call routing instructions.

26. The monitoring location register of claim 21 wherein said input interface is for receiving call request information from a single switch.

27. The monitoring location register of claim 21 wherein said input interface is for receiving call request information from multiple switches.

* * * * *

UNITED STATES PATENT AND TRADEMARK OFFICE
CERTIFICATE OF CORRECTION

PATENT NO. : 6,131,032
DATED : October 10, 2000
INVENTOR(S) : Pramodkumar Patel

It is certified that error appears in the above-identified patent and that said Letters Patent is hereby corrected as shown below:

Column 9,
Lines 30 and 55, delete "cellular".
Line 59, delete "called" and replace with -- to a call --.

Column 10,
Line 5, delete "called" and replace with -- call --.

Signed and Sealed this

Twentieth Day of August, 2002

Attest:

Attesting Officer

JAMES E. ROGAN
Director of the United States Patent and Trademark Office